United States Patent Office 3,272,225
Patented Sept. 13, 1966

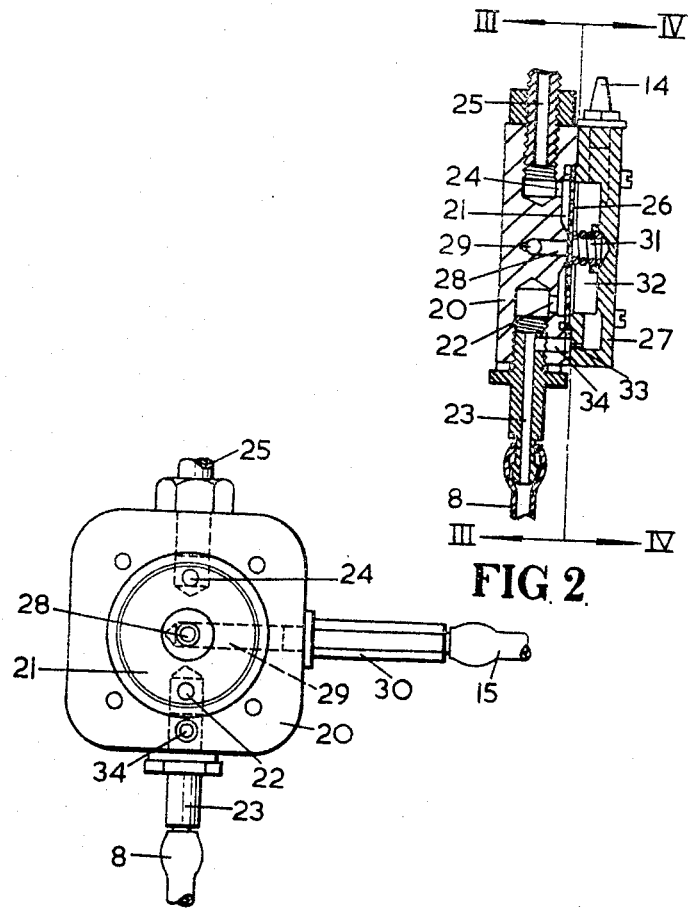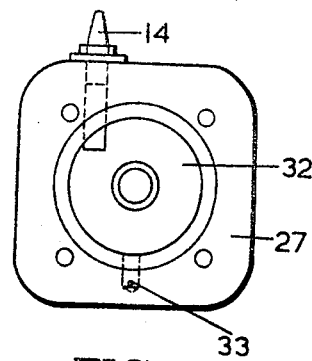

3,272,225
APPARATUS FOR WATERING PLANTS
Ronald C. Frampton, Ringwood, England, assignor to MacPennys Mist Propagation Limited, Ringwood, England
Filed Feb. 26, 1964, Ser. No. 347,477
Claims priority, application Great Britain, Mar. 2, 1963, 8,452/63
5 Claims. (Cl. 137—408)

The invention relates to apparatus for the periodic watering of plants or for periodic irrigation and has as an object the provision of apparatus whereby watering can be effected automatically at preselected intervals and for preselected periods of duration.

According to the invention, the apparatus comprises a syphon tank, arranged to be fed from a water supply via a device capable of controlling the rate of flow of water from the supply to the syphon tank; a syphon tube positioned within the syphon tank and so arranged therein that it will empty water from the syphon tank, when a predetermined depth of water has collected therein; a balance tank arranged beneath the discharge end of the syphon tube to receive the water discharged therefrom, the balance tank having an outlet permitting restricted flow therefrom and being mounted on a balance arm, arranged to operate a valve for controlling the flow of water from the said supply, or from another source, to one or more watering orifices, nozzles or similar devices, the valve normally being held closed by the balance arm when the balance tank is empty, or contains a minimum quantity of water, and being allowed to open, by pivotal movement of the balance arm from its normal position, by the additional weight of water in the balance tank, when the latter has received the discharge of water from the syphon tank.

Conveniently, the device for controlling the rate of flow of water into the syphon tank may be an adjustable drip feed device, whereby the length of the intervals between successive discharges of the syphon tube can be controlled.

The outlet from the balance tank may be adjustable in flow area. For example, it may be an orifice therein, controllable by an adjustable needle valve, whereby the rate of emptying of water from the balance tank and hence the duration of each watering period can be controlled.

By way of example, one form of apparatus according to the invention will now be described, with reference to the accompanying drawings, in which:

FIGURE 2 is a section on the line II—II through the valve shown in FIGURE 1;

FIGURE 3 is a view on the line III—III of the valve shown in FIGURE 2, and

FIGURE 4 is a view on the line IV—IV of the valve shown in FIGURE 2.

Figure 1:
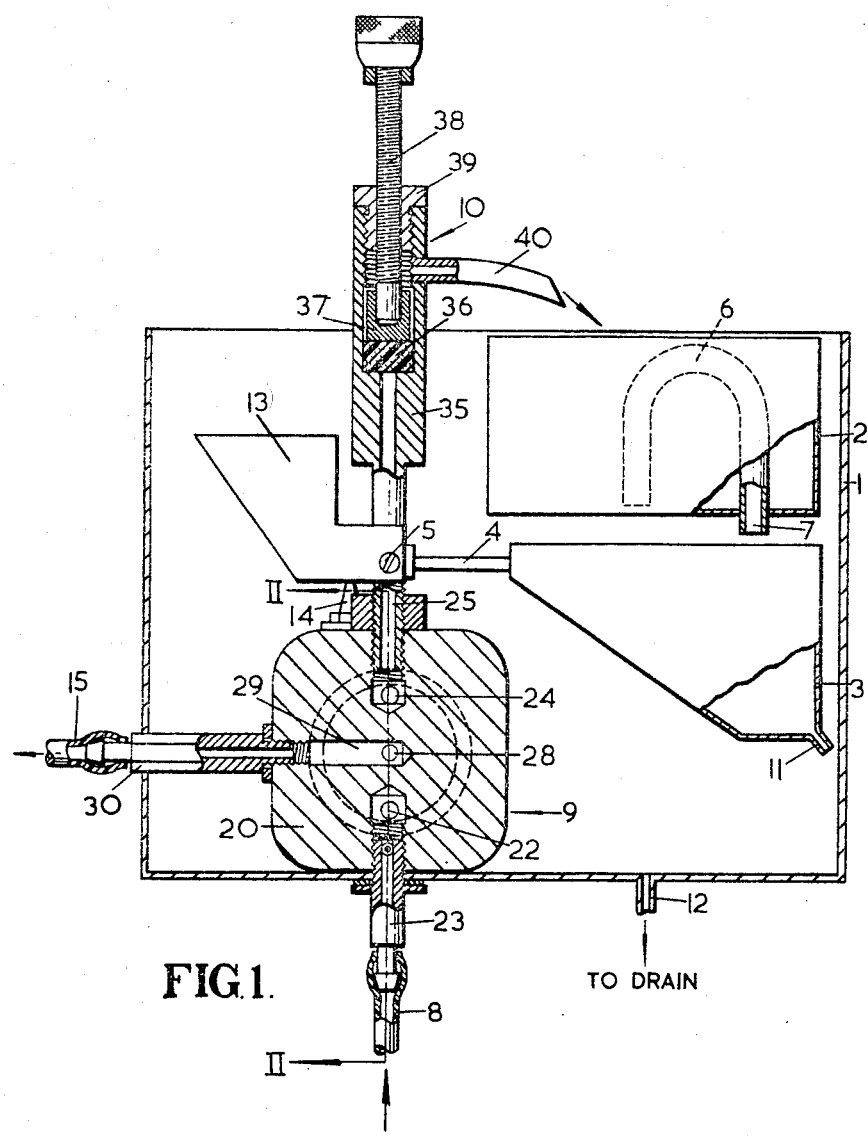
FIGURE 1 is a part vertical sectional view through the apparatus.

Referring first to FIGURE 1, the apparatus consists of an outer tank 1 containing a syphon tank 2 positioned above a balance tank 3, carried on one end of a balance arm 4, pivotally mounted in the container about a pivot 5 in such a manner that the balance tank 3 can swing upwardly and downwardly beneath the syphon tank 2. The syphon tank 2 contains a syphon tube 6 having its discharge limb 7 arranged to discharge into the balance tank 3. The height of the top of the syphon tube 6 determines the depth of water that has to collect in the syphon tank 2 before the syphon tube will discharge water into the balance tank 3 and hence determines the quantity of water which will be discharged into the balance tank at each discharge of the syphon tube. The pivot 5 is mounted on an adjustable drip feed device 10 so arranged in the outer tank 1 as to discharge into the syphon tank 2 and connected to be fed from a water supply pipe 8 leading through a valve 9 also positioned in the outer tank 1 and which controls the flow of water from the supply pipe 8 to a delivery pipe 15. The valve 9 will be described hereinafter. The drip feed device is of the kind containing a porous pad, or a column of porous pads or discs, which is adjustably compressible by a screw control to vary the rate of drip into the syphon tank and will be described hereinafter. The balance tank has a small orifice 11 near the bottom thereof to give a restricted flow of water from the balance tank 3 into the outer tank 1. The outer tank 1 has a waste orifice or pipe 12 leading to a drain or to a watering pipe, by which water that has emptied from the balance tank into the outer tank 1, will leave the latter. The balance arm 4 carries a counter-weight 13 by which the arm 4 is held in a position in which the counter-weight, or another part of the arm, engages and closes a bleed orifice 14 communicating with the interior of the valve 9, as will hereinafter be described, when the balance tank 3 is empty, or contains a predetermined minimum quantity of water. As will hereinafter be described, when the orifice 14 is closed the valve will prevent flow between the inlet pipe 8 and the delivery pipe 15. When the balance tank 3 has received a discharge of water from the syphon tank 2, the additional weight of the water in the balance tank 3 causes the arm 4 to pivot and hence the counter-weight 13 will be lifted to open the bleed orifice 14, thereby causing the valve to open to permit flow between the inlet pipe 8 and the delivery pipe 15.

The valve 9 is shown in FIGURES 2 to 4 and comprises a base block 20 having therein a central flat cylindrical cavity 21, which communicates, via a duct 22, with an inlet connector 23 on which the inlet pipe 8 is fitted, and, via a duct 24, with a pipe 25 leading to the drip feed device 10. The cavity 21 is closed by a flexible diaphragm 26, e.g. of rubber, which is sealingly clamped around its periphery between the base block 20 and a cap block 27 tightly secured together. There is always a flow connection through the cavity 21 between the ducts 22 and 24 and thus so long as water is flowing through the pipe 8, there will be a supply to the drip feed device 10. The cavity also has a central port 28, arranged to be closed or opened by movement of the diaphragm 26, and communicating, via a duct 29, with a connector 30, to which the delivery pipe 15 is attached. The diaphragm 26 is biased towards the closed position by a spring 31, positioned in a cavity 32 in the cap block 27, and acting between the latter and the diaphragm. The cavity 32 has a small diameter inlet hole 33, communicating through a duct 34 with the inlet connector 23 and has an outlet through the aforesaid orifice 14. When the orifice 14 is closed by the counter-weight 13, water is trapped in the cavity 32 behind the diaphragm 26 and so the pressure of water in the cavity 21 is opposed not only by the spring 31, but also by the pressure of the trapped water. When the orifice 14 is open, water flows through the cavity 32 and as a result there is a fall of pressure therein and so the greater pressure of water in the cavity 21 displaces the diaphragm 26 to the right, as viewed in FIGURE 2, and so opens the port 28, thereby permitting flow of water between the inlet pipe 8 and the delivery pipe 15.

The drip feed device 10 comprises a housing 35, communicating at its lower end with the pipe 25 and containing a resilient porous pad 36, engaged by a plunger 37, which is movable vertically to squeeze or release the pad 36 in a controllable manner by means of a screw 38, threadedly-engaged in a cap 39, closing the top of the housing 35. The interior of the housing 35 communicates with a spout 40, arranged to discharge water into the syphon tank 2. Water is allowed to seep upwardly through the porous pad 36 into the interior of the housing 35 above the pad and hence to the spout 40, at a controlled rate according to the position in which the plunger 37 has been set by the screw 38.

The operation of the apparatus is as follows. The water supply pipe 8 operates continually to supply water to the drip feed device 10, which has previously been so adjusted that the desired rate of drip into the syphon tank 2 takes place. When the level of water in the syphon tank 2 has reached the level of the top of the syphon tube 6, the water in the syphon tank 2 is automatically discharged through the syphon tube 6 into the balance tank 3. The balance arm 4 immediately pivots and so lifts the counterweight 13, which opens the orifice 14, thereby allowing the diaphragm 26 to be lifted to admit water to the delivery pipe 15 and thence to a watering device or devices e.g. spraying nozzles or mist-producing jets. Immediately the water has discharged into the balance tank 3, the water will commence to flow through the orifice 11 into the outer tank 1 and then to drain through the pipe 12. When the balance tank 3 has emptied sufficiently for the counterweight 13 to fall again and therefore to close the orifice 14, the diaphragm 26 again closes the port 28 and the flow to the delivery pipe 15 ceases. The diaphragm 26 will remain in its closed position until the syphon tank 2 has again been filled to the level at which the syphon tube 6 will again discharge into the balance tank 3. Thus it will be seen that the apparatus enables watering to take place at predetermined intervals determined by the rate of filling of the syphon tank 2, i.e. by the setting of the drip feed device 10, the duration of each watering operation being determined by the rate of emptying of the balance tank 3 through the orifice 11.

If desired, the rate of emptying the balance tank 3 can be controlled by providing an adjustable needle valve in the orifice 11.

Instead of the valve 9 illustrated and described herein, the counter-weight 13 or the balance arm 4 may be arranged to operate a hydraulic servo valve or an electrical relay arranged to operate a valve, controlling the flow between the inlet pipe 8 and the delivery pipe 15.

The drip feed device 10 may be replaced by any other device for adjustably controlling the rate of feed of water to the syphon tank 2.

What I claim as my invention and desire to secure by Letters Patent of the United States is:

1. Apparatus, for the periodic watering of plants or for periodic irrigation, comprising a syphon tank; a feed device, arranged to be connected to a water supply and to discharge into said syphon tank, for controlling the rate of flow of water from said supply to said syphon tank; a syphon tube positioned within the syphon tank and so arranged therein as to empty water from said syphon tank, when a predetermined depth of water has collected therein; a balance tank arranged beneath the discharge end of said syphon tube to receive the water discharged therefrom, said balance tank having an outlet permitting restricted flow therefrom; a balance arm on which said balance tank is mounted and a valve for controlling the flow of water from a water supply to at least one watering means, said valve being held closed by said balance arm, when said balance tank contains less than a datum quantity of water, and being permitted to open by pivotal movement of said balance arm, by the additional weight of water in said balance tank, when the latter has received a discharge of water from said syphon tube.

2. Apparatus as claimed in claim 1 in which said feed device includes an adjustable drip feed means, whereby the length of the intervals between successive discharges of said syphon tube can be controlled.

3. Apparatus as claimed in claim 2 in which the flow area of said outlet from said balance tank is adjustable.

4. Apparatus as claimed in claim 3 in which said outlet from said balance tank comprises an orifice therein and an adjustable needle valve co-operating with said orifice, whereby the rate of the emptying of water from said balance tank and hence the duration of each watering period can be controlled.

5. Apparatus, for the periodic watering of plants or for periodic irrigation, comprising a syphon tank; a feed device, arranged to be connected to a water supply and to discharge into said syphon tank, for controlling the rate of flow of water from said supply to said syphon tank; a syphon tube positioned within the syphon tank and so arranged therein as to empty water from said synphon tank, when a predetermined depth of water has collected therein; a balance tank arranged beneath the discharge end of said sypon tube to receive the water discharged therefrom, said balance tank having an outlet permitting restricted flow therefrom; a balance arm on which said balance tank is mounted and a valve, said valve comprising an inlet for connection to a water supply; an outlet for connection to at least one watering means; a diaphragm controlling the flow of water through said valve between said valve inlet and said valve outlet; means defining a chamber within said valve, one wall of said chamber being said diaphragm; a duct leading to said chamber from said valve inlet, and an outlet orifice from said chamber, said outlet orifice being closed by said balance arm, when said balance tank contains less than a datum quantity of water, said diaphragm then being held by the water pressure in said chamber in the position in which it prevents flow water from said valve inlet to said valve outlet, and said outlet orifice being opened by pivotal movement of said balance arm, by the additional weight of water in said balance tank, when the latter has received a discharge of water from said syphon tube, said water pressure in said chamber therefore being reduced and permitting said diaphragm to move to a position in which there is communication between said valve inlet and said valve outlet.

References Cited by the Examiner

UNITED STATES PATENTS

| | | | |
|---|---|---|---|
| 1,822,901 | 9/1931 | De Lacy-Mulhall | 137—624.14 |
| 3,006,544 | 10/1961 | Harris | 239—65 X |

FOREIGN PATENTS 296,801   9/1928   Great Britain.

WILLIAM F. O'DEA, *Primary Examiner.*

A. COHAN, *Assistant Examiner.*